(12) United States Patent
Pentyala et al.

(10) Patent No.: US 12,197,317 B2
(45) Date of Patent: Jan. 14, 2025

(54) SYSTEMS AND METHODS FOR PROVIDING AN AUTOMATED TESTING PIPELINE FOR NEURAL NETWORK MODELS

(71) Applicant: Salesforce, Inc., San Francisco, CA (US)

(72) Inventors: Shiva Kumar Pentyala, Mountain View, CA (US); Shashank Harinath, Mountain View, CA (US); Sitaram Asur, Newark, CA (US); Zachary Alexander, Berkeley, CA (US)

(73) Assignee: Salesforce, Inc., San Francisco, CA (US)

( * ) Notice: Subject to any disclaimer, the term of this patent is extended or adjusted under 35 U.S.C. 154(b) by 179 days.

(21) Appl. No.: 18/156,323

(22) Filed: Jan. 18, 2023

(65) Prior Publication Data

US 2024/0241820 A1    Jul. 18, 2024

(51) Int. Cl.
*G06F 11/36* (2006.01)

(52) U.S. Cl.
CPC ...... *G06F 11/3688* (2013.01); *G06F 11/3684* (2013.01)

(58) Field of Classification Search
CPC ........................ G06F 11/3684; G06F 11/3688
USPC .................................. 717/104–105, 124–126
See application file for complete search history.

(56) References Cited

U.S. PATENT DOCUMENTS 10,089,576 B2 * 10/2018 Gao .................... G06F 16/9535
11,222,253 B2 * 1/2022 Hashimoto ............ G06N 3/063
2022/0374604 A1 * 11/2022 Sivakumar .............. G06F 40/35
2024/0185001 A1 * 6/2024 Nagaraju ............... G06F 40/284
2024/0211501 A1 * 6/2024 Zhang ................. G06F 16/3344

OTHER PUBLICATIONS

Araujo et al., "From Bag-of-Words to Pre-trained Neural Language Models: Improving Automatic Classification of App Reviews for Requirements Engineering", 2020, ResearchGate, pp. 1-12. (Year: 2020).*
Minaee et al., "Deep Learning Based Text Classification: A Comprehensive Review", ACM, 2021, pp. 1-40. (Year: 2021).*
Lin et al., "Dependency Parsing via Sequence Generation", 2022, Association for Computational Linguistics, pp. 7339-7353. (Year: 2022).*

* cited by examiner

*Primary Examiner* — Ted T. Vo
(74) *Attorney, Agent, or Firm* — Haynes and Boone, LLP (57) ABSTRACT

Embodiments described herein provide an automated testing pipeline for providing a testing dataset for testing a trained neural network model trained using a first training dataset. A first testing dataset for the trained neural network including a first plurality of user queries is received. A dependency parser is used to filter the first plurality of user queries based on one or more action verbs. A pretrained language model is used to rank the remaining user queries based on respective relationships with queries in the first training dataset. Further, user queries that are classified as keyword matches with the queries in the first training dataset using a bag of words classifier are removed. A second testing dataset is generated using the ranked remaining user queries. Testing outputs are generated, by the trained neural network model, using the second testing dataset.

20 Claims, 9 Drawing Sheets

Eliminated samples (ones without action verbs) 402

"Yes"
"Something else"
"Ok, thanks. That's a good start!"
"I know that"
"you too"
"bye"
"hi there"
"lol. this is so bad"
"my number is <>"

Output samples (with action verbs) 404

"delete my account"
"do you have a picture of grains?"
"what size do i need to select?"
"If i cancel my subscription do i lose all my money?"
"change my tv plan"

*FIG. 4*

Input 502 admin defined intentset
"intent_loginIssues": ["I need to reset my password", "I cannot reset my pas

Output 504

"I need to reset my password" -> prediction: intent_loginIssues -> 87% simil

*FIG. 5*

Input 602

\# admin defined intentset

"intent_loginIssues": ["I need to reset my password", "I cannot reset my pas...

Output 604

"I need to reset my password" -> correctly predicted as: intent_loginIssues

"Need help to login" -> mis-predicted -> so considered as hard example

*FIG. 6*

Eliminated samples 702

"I need to reset my password"
"I can't reset my password"
"cannot recover password"

Output samples 704

"Need help to login"
"I have a new email address"
"Need to find my user ID"
"can i change my username?"
"I am unable to log on. The system does not send a message"

SYSTEMS AND METHODS FOR PROVIDING AN AUTOMATED TESTING PIPELINE FOR NEURAL NETWORK MODELS

TECHNICAL FIELD

The embodiments relate generally to machine learning systems, and more specifically to providing an automated testing pipeline for testing neural network models.

BACKGROUND

Evaluation of deep learning models is an essential step to verify how well the trained model can handle unseen queries. Typically, people may use some percentage of the original training dataset as a test dataset to validate the trained model. However, this evaluation procedure wouldn't be an optimal estimate for smaller datasets or when real-time distribution varies significantly from the original training dataset distribution. For example, during intent classification task, first during the training process, making the model learn the query "I would like to change password" as "login issues" intent, and then testing it on queries like "change password" which is similar to the queries used in training doesn't guarantee model robustness.

Therefore, there is a need for developing improved testing datasets to better estimate model robustness.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Evaluation of deep learning models is an essential step to verify how well the trained model can handle unseen queries. Typically, people use some percentage of the original dataset as a test set to validate the trained model. However, this evaluation procedure wouldn't be an optimal estimate. For example, during intent classification task, making the model learn the query "I would like to change password" as "login issues" intent, and testing it on queries like "change password" doesn't guarantee model robustness.

As such, an improved sophisticated test/evaluation set to get a better estimate of model robustness is needed. For example, a testing/evaluation set with sentences like "unable to login", "forgot username" is used to verify if the model properly understood "login issues" intent. Manual curation of such evaluation sets often is time consuming, especially for chatbots with millions of conversations. Furthermore, when the training dataset is given by administrators, it may vary a lot from real-time customer queries. As such, there is a distribution shift between real-time production queries and training samples. Accordingly, it is desirable to test the model on real data, however, the real data is challenging for manual curation.

The automated testing pipeline model helps to better test the performance of the trained neural network model. By building a diverse evaluation dataset that is different from the training dataset, the evaluation is closer to the real-time model performance.

As described in detail below, an automated testing pipeline model is described to create a testing dataset for validating model robustness. The automated testing pipeline includes a hierarchical combination of a dependency parser, a pretrained language model, and a bag of words (BoW) classifier to curate easy and hard evaluation datasets from real time customer data. For example, "hard eval sets" may include the samples that are diverse enough from the training data (e.g., provided by the administer) used to training the neural network model for evaluating.

While the description below uses intent classification tasks as an example, the automated testing pipeline model may apply to various tasks beyond intent classification tasks, including e.g., dialogue act detection, sentiment classification, topic classification etc. Furthermore, the automated testing pipeline model is language-agnostic. Given components in the automated testing pipeline model work in multilingual settings, it can apply to hundreds of languages.

Moreover, the automated testing pipeline model helps to improve the model performance by establishing a feedback cycle between model and human (referred to as human-in-the-loop), where human/manual adjustment to the training set is performed based on the evaluation result. For example, the initial training dataset may be provided by administrators based on their prior, and does not reflect the actual interacted utterances with chat-bots implemented using the neural network model. The automated testing pipeline model may identify gaps, and communicate them to the administrators, and the administrators may adjust the training dataset based on the feedback from the automated testing pipeline model, e.g., by adding missed/harder samples to the training set. As such, human-in-the-loop feedback cycles may lead to better model performance after each interaction of the feedback cycle.

Figure 1:
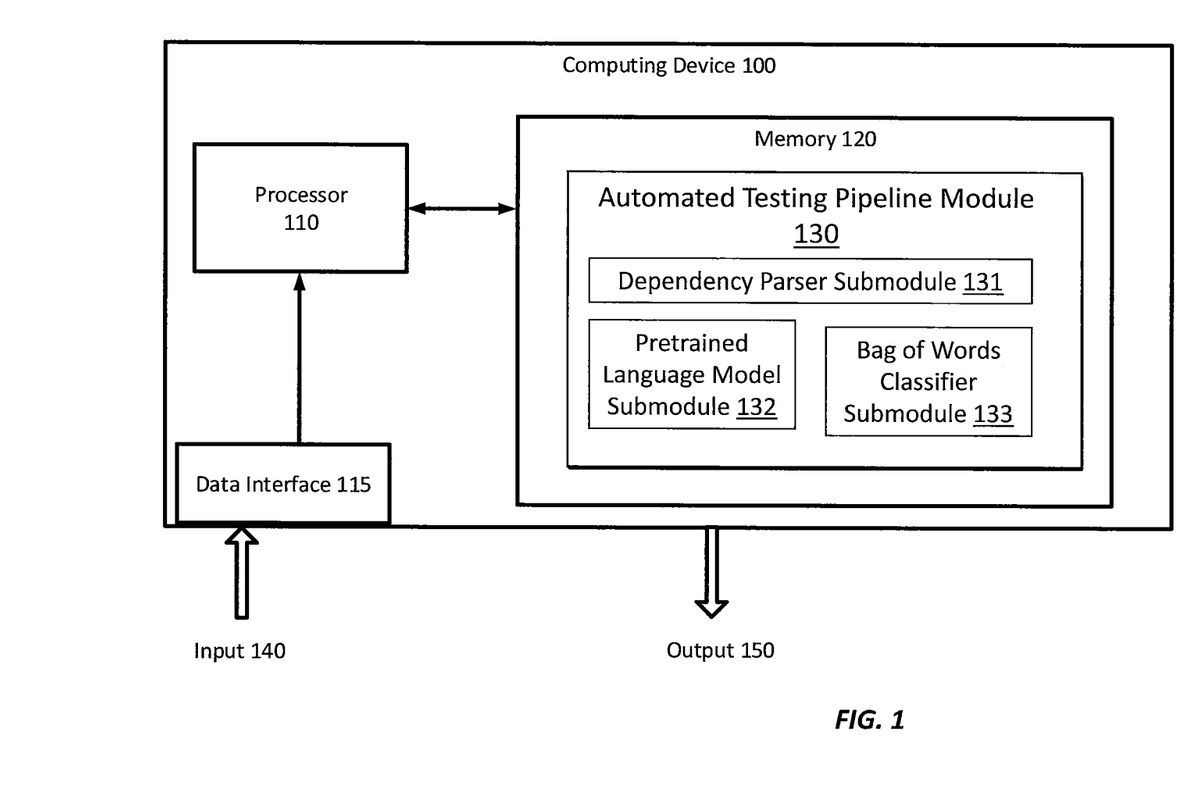
FIG. 1 is a simplified block diagram illustrating the framework of an automated testing pipeline model, according to one embodiment described herein.

FIG. 1 is a simplified diagram illustrating a computing device implementing the Automated Testing Pipeline framework described throughout the specification, according to one embodiment described herein. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for Automated Testing Pipeline module 130 that may be used to implement and/or emulate the systems and models, and/or to implement any of the methods described further herein. An Automated Testing Pipeline module 130 may receive input 140 such as user queries data via the data interface 115 and generate an output 150, which may be a testing dataset generated based on the user queries data.

The data interface 115 may comprise a communication interface, a user interface (such as a voice input interface, a graphical user interface, and/or the like). For example, the computing device 100 may receive the input 140 (such as a training dataset) from a networked database via a communication interface. Or the computing device 100 may receive the input 140, such as an articulated question, from a user via the user interface.

In some embodiments, the Automated Testing Pipeline module 130 is configured to generate an answer in response to an image and a question based on the image. The Automated Testing Pipeline module 130 may further include a dependency parser submodule 131, a pretrained language model submodule 132, a bag of words classifier submodule 133, which are all further described below. In one embodiment, the Automated Testing Pipeline module 130 and its submodules 131-134 may be implemented by hardware, software and/or a combination thereof.

In one embodiment, the Automated Testing Pipeline module 130 and its submodules 131-133, may be implemented by hardware, software and/or a combination thereof.

In one embodiment, the Automated Testing Pipeline module 130 and one or more of its submodules 131-133 may be implemented using one or more artificial neural network. The neural network comprises a computing system that is built on a collection of connected units or nodes, referred as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 120 as a structure of layers of neurons, and parameters describing the non-linear transformation at each neuron and the weights associated with edges connecting the neurons. An example neural network may be a pretrained language model, and/or the like.

In one embodiment, the neural network based automated testing pipeline module 130 and one or more of its submodules 131-133 may be trained by updating the underlying parameters of the neural network based on a loss, e.g., a metric that evaluates how far away a neural network model generates a predicted output value from its target output value (also referred to as the "ground-truth" value). Given the computed loss, the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate a predicted output value closer to the target output value.

Some examples of computing devices, such as computing device 100 may include non-transitory, tangible, machine readable media that include executable code that when run by one or more processors (e.g., processor 110) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH- EPROM, any other memory chip or cartridge, and/or any other medium from which a processor or computer is adapted to read.

Figure 2:
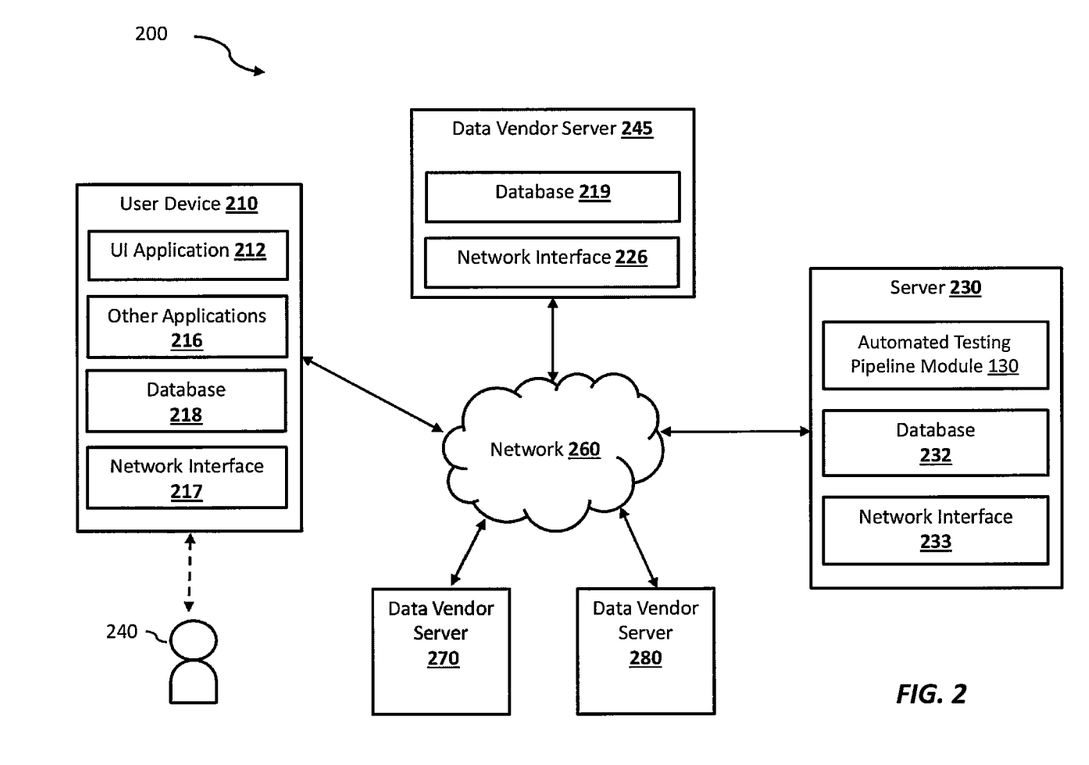
FIG. 2 is a simplified diagram illustrating a computing device implementing the automated testing pipeline model described in FIG. 1, according to one embodiment described herein.

FIG. 2 is a simplified block diagram of a networked system suitable for implementing the Automated Testing Pipeline framework in embodiments described herein. In one embodiment, block diagram 200 shows a system including the user device 210 which may be operated by user 240, data vendor servers 245, 270 and 280, server 230, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data vendor servers 245, 270 and 280, and the server 230 may communicate with each other over a network 260. User device 210 may be utilized by a user 240 (e.g., a driver, a system admin, etc.) to access the various features available for user device 210, which may include processes and/or applications associated with the server 230 to receive an output data anomaly report.

User device 210, data vendor server 245, and the server 230 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 210 may be implemented as a communication device that may utilize appropriate hardware and software configured for wired and/or wireless communication with data vendor server 245 and/or the server 230. For example, in one embodiment, user device 210 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface (UI) application 212, and/or other applications 216, which may correspond to executable processes, procedures, and/or applications with associated hardware. For example, the user device 210 may receive a message indicating an answer to a visual question from the server 230 and display the message via the UI application 212. In other embodiments, user device 210 may include additional or different modules having specialized hardware and/or software as required.

In various embodiments, user device 210 includes other applications 216 as may be desired in particular embodiments to provide features to user device 210. For example, other applications 216 may include security applications for implementing client-side security features, programmatic client applications for interfacing with appropriate application programming interfaces (APIs) over network 260, or other types of applications. Other applications 216 may also include communication applications, such as email, texting, voice, social networking, and IM applications that allow a user to send and receive emails, calls, texts, and other notifications through network 260. For example, the other application 216 may be an email or instant messaging application that receives a prediction result message from the server 230. Other applications 216 may include device interfaces and other display modules that may receive input and/or output information. For example, other applications 216 may contain software programs for asset management, executable by a processor, including a graphical user interface (GUI) configured to provide an interface to the user 240 to view the answer.

User device 210 may further include database 218 stored in a transitory and/or non-transitory memory of user device 210, which may store various applications and data and be utilized during execution of various modules of user device 210. Database 218 may store user profile relating to the user 240, predictions previously viewed or saved by the user 240, historical data received from the server 230, and/or the like. In some embodiments, database 218 may be local to user device 210. However, in other embodiments, database 218 may be external to user device 210 and accessible by user device 210, including cloud storage systems and/or databases that are accessible over network 260.

User device 210 includes at least one network interface component 219 adapted to communicate with data vendor server 245 and/or the server 230. In various embodiments, network interface component 219 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 245 may correspond to a server that hosts one or more of the databases 203a-n (or collectively referred to as 203) to provide training datasets including training images and questions to the server 230. The database 203 may be implemented by one or more relational database, distributed databases, cloud databases, and/or the like.

The data vendor server 245 includes at least one network interface component 226 adapted to communicate with user device 210 and/or the server 230. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 245 may send asset information from the database 203, via the network interface 226, to the server 230.

The server 230 may be housed with the Automated Testing Pipeline module 130 and its submodules described in FIG. 1. In some implementations, module 130 may receive data from database 219 at the data vendor server 245 via the network 260 to generate an answer to a visual question. The generated answer may also be sent to the user device 210 for review by the user 240 via the network 260.

The database 232 may be stored in a transitory and/or non-transitory memory of the server 230. In one implementation, the database 232 may store data obtained from the data vendor server 245. In one implementation, the database 232 may store parameters of the Automated Testing Pipeline module 130. In one implementation, the database 232 may store previously generated answers, and the corresponding input feature vectors.

In some embodiments, database 232 may be local to the server 230. However, in other embodiments, database 232 may be external to the server 230 and accessible by the server 230, including cloud storage systems and/or databases that are accessible over network 260.

The server 230 includes at least one network interface component 233 adapted to communicate with user device 210 and/or data vendor servers 245, 270 or 280 over network 260. In various embodiments, network interface component 233 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

Figure 3:
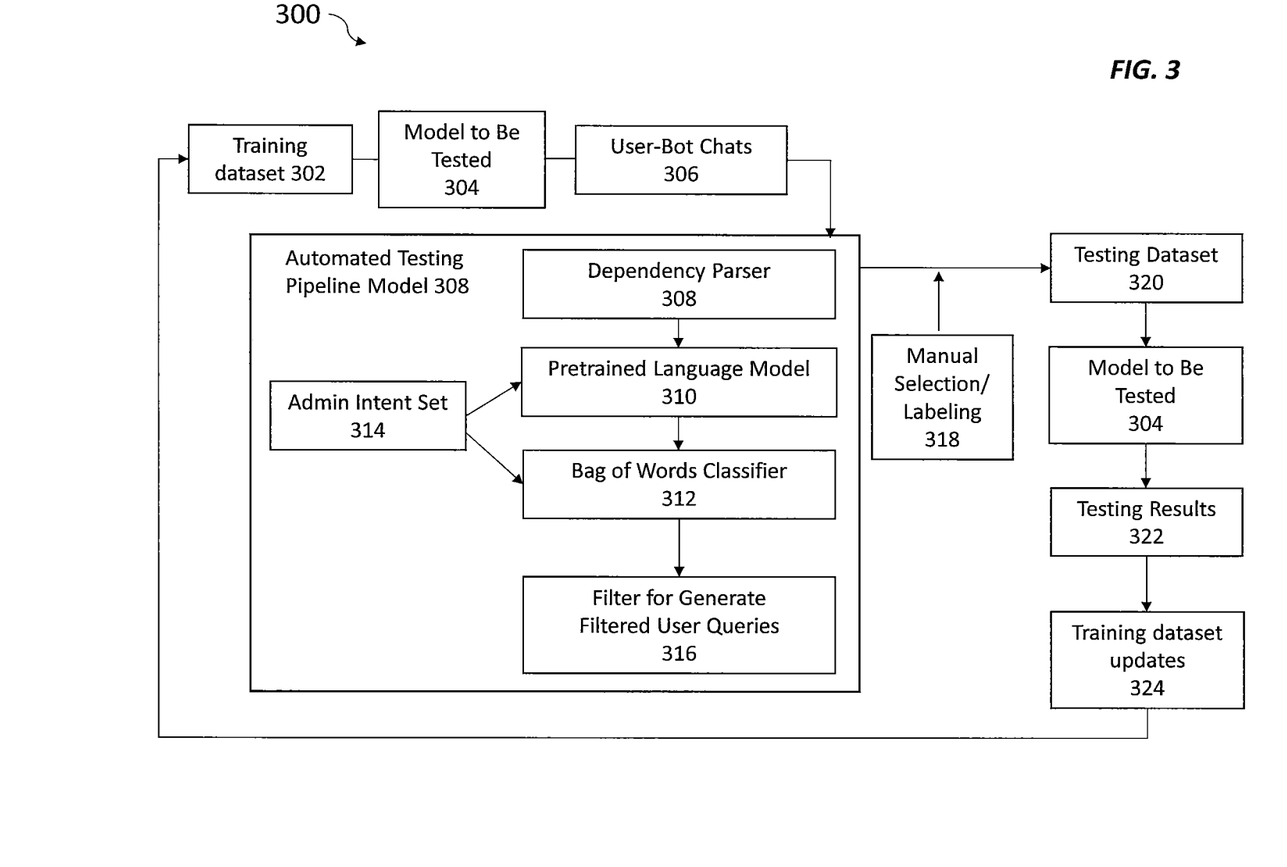
FIG. 3 is a simplified block diagram illustrating an example method of using an automated testing pipeline model to generate a testing dataset for testing a trained neural network model and to improve the training dataset for the neural network model, according to one embodiment described herein.

FIG. 3 is a simplified block diagram illustrating an automated testing pipeline framework 300 used for providing a testing dataset and an improved training dataset for a trained neural network model, according to one embodiment described herein. As shown in FIG. 3, the performance of a neural network model 304 trained using the training dataset 302 is to be evaluated. The real-time user queries from the user-bot chats 306, which is provided by the trained neural network model 304, are collected.

The automated testing pipeline model 308 receives the user queries from the user-bot chats 306, and generates testing datasets 320. Specifically, the automated testing pipeline model 308 includes a hierarchical combination of a dependency parser 308, a pretrained language model 310, and a naive bag of words classifier 312.

Figure 4:
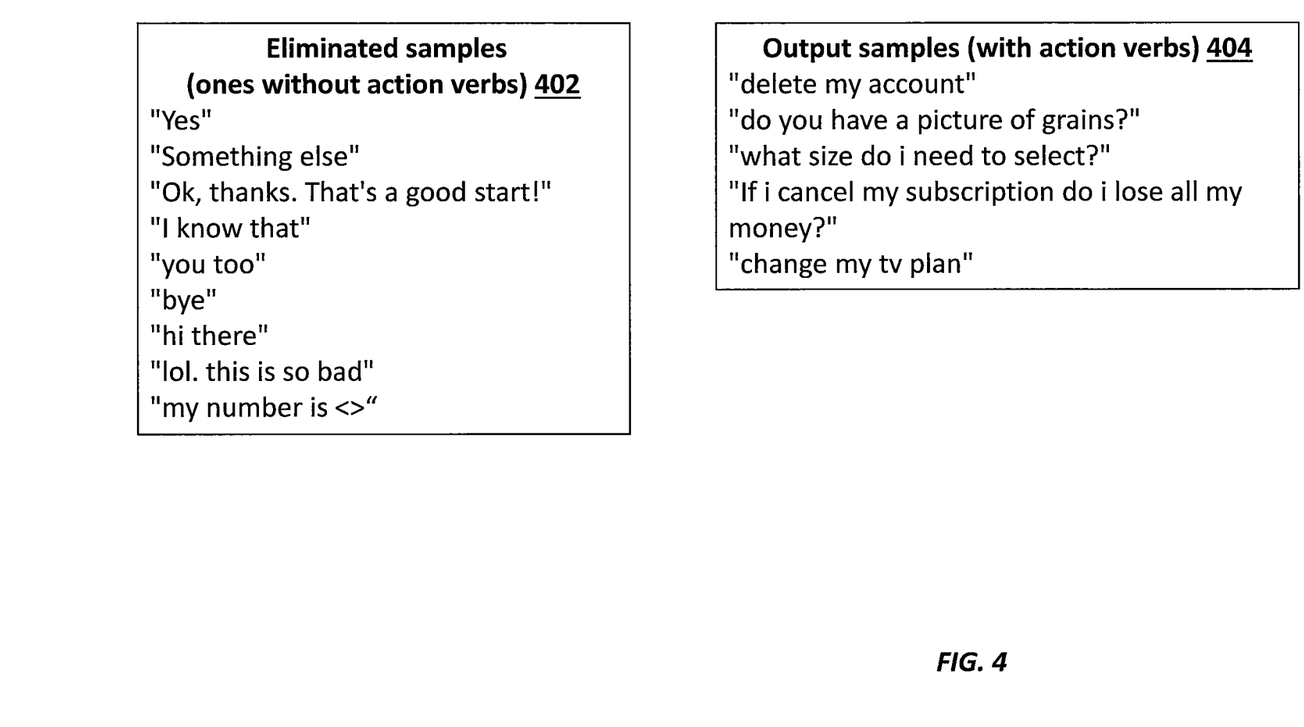
FIG. 4 provides example eliminated samples and output samples of the dependency parser of the automated testing pipeline model, according to some embodiments described herein.

Referring to FIGS. 3 and 4, in some embodiments, the dependency parser 308 of the automated testing pipeline model 308 may filter user queries without action verbs and/or action-object pairs. FIG. 4 illustrates some example samples eliminated by the dependency parser 308 and some example output samples of the dependency parser 308. For example, samples without action verbs 402 (e.g., "Yes," "Something else," "Ok, thanks. That's a good start!," etc.) are eliminated by the dependency parser 308. For further example, output samples 404 of the dependency parser 308 may include samples with action verbs (e.g., "delete my account," "do you have a picture of grains?" "what size do i need to select?," etc.). Various types of dependency parsers (e.g., an open-source SpaCy dependency parser, etc.) may be used to implement the dependency parser 308 of the automated testing pipeline model 308.

Figure 5:
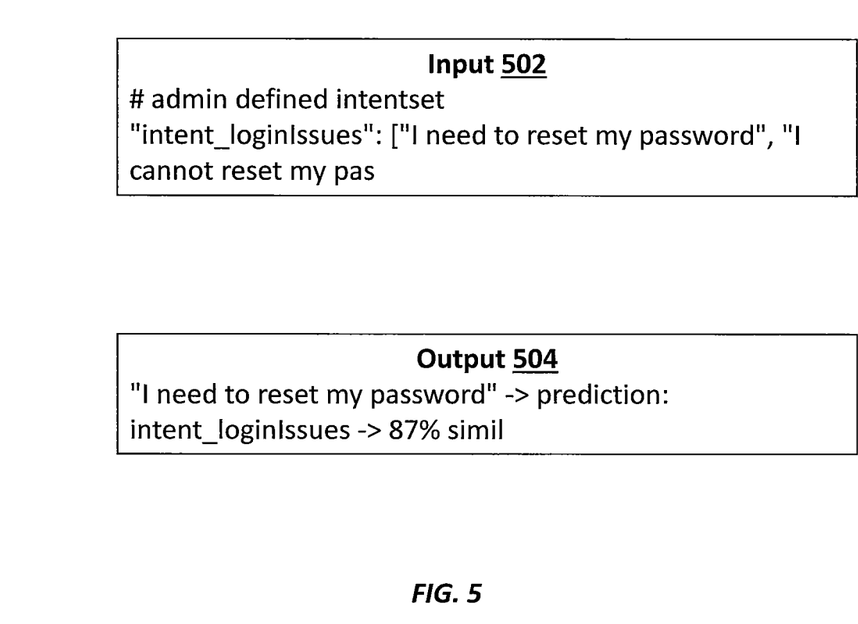
FIG. 5 provides example inputs and outputs of the pretrained language model (PLM) of the automated testing pipeline model, according to some embodiments described herein.

Referring to FIGS. 3 and 5, in some embodiments, a pretrained language model 310 receives the filtered output samples 404 from the dependency parser 308. The pretrained language model 310 may label and rank the received user queries, e.g., by doing semantic search with the training dataset 302 (including e.g., admin provided intent set samples 314 for training the model 304 to perform an intent classification task). Various types of pretrained language models (e.g., Microsoft's sentence-transformers/all-mpnet-base-v2, etc.) may be used to implement the pretrained language model 310. In some embodiments, the pretrained language model may be selected based on its performance on semantic similarity tasks.

Referring to FIG. 5, illustrated therein are example inputs and outputs of the pretrained language model 310. For example, the input 502 includes intent dataset samples defined by the administrator (e.g., in a training dataset provided by the administrator), including the intent of "intent_loginIssues" with associated queries, "I need to reset my password" and "I cannot reset my pas . . . ." The output 504 includes user queries together with corresponding classification labels and confidence scores (used for rankings) provided by the pretrained language model. For example, output 504 includes an example classification of "intent_loginIssues" for the user query "I need to reset my password," a similarity confidence (ranking) score of 87%.

In some embodiments, to minimize the bias caused by an individual pretrained language model in semantic searches, an ensemble approach for ranking samples by using multiple pretrained language models may be used. For example, the combined ranking of rankings from the multiple pretrained language models may be used. In some embodiments, the combination may be based on weights assigned to the multiple pretrained language models respectively, where a weight may be assigned based on the bias evaluation of a particular pretrained language model. In other embodiments, a manual review step may be performed to reduce such bias.

Figure 6:
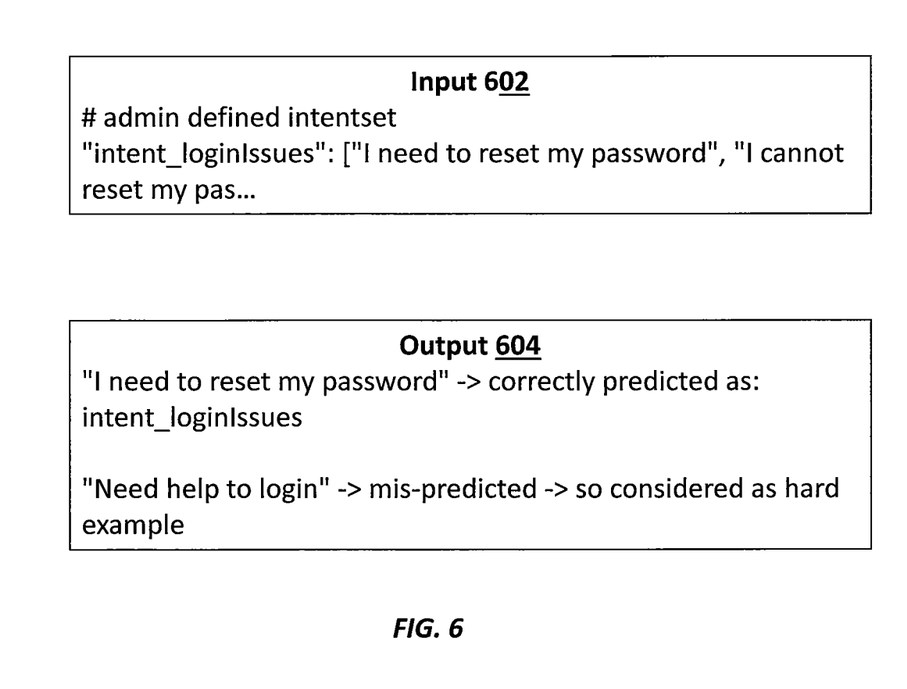
FIG. 6 provides example inputs and outputs of the bag of words (BoW) classifier of the automated testing pipeline model, according to some embodiments described herein.

Referring to FIGS. 3 and 6, in some embodiments, a bag of words classifier 312 is used to detect samples that are very similar to the administrator defined intent sets, e.g., based on exact keyword matches. Various types of bag of words classifiers may be used to implement the bag of words classifier 132, including e.g., term frequency-inverse document frequency (TF-IDF) vectorizer, Linear Support Vector Machine (SVM), any other suitable bag of words classifier, and/or a combination thereof.

Referring to FIG. 6, example inputs and outputs of the bag of words classifier 312 are illustrated. For example, the example input 602 includes the administrator defined intent set, including e.g., "intent_loginIssues" associated with queries "I need to reset my password" and "I cannot reset my pas . . . ". The example output 605 of the bag of words classifier 314 includes prediction based on exact keyword matches with the administrator defined intent set. For example, for query "I need to reset my password," the bag of words classifier 314 correctly predicts its intention to be "intent_loginIssues" based on the input 602 based on exact keyword match. As such, the query "I need to reset my password" may be considered as an easy example, and using this query may not provide a good estimate of the robustness of the trained neural network model. For further example, the bag of words classifier 314 mis-predict the intent for the query "Need help to login" based on exact key word match, and as such, may be considered as a hard example, which is diverse enough from the admin provided training data. Using such a hard example for testing the trained neural network model may provide a better estimate of how well the application (e.g., a chat robot) using the trained neural network does on real time customer/user queries.

Figure 7:
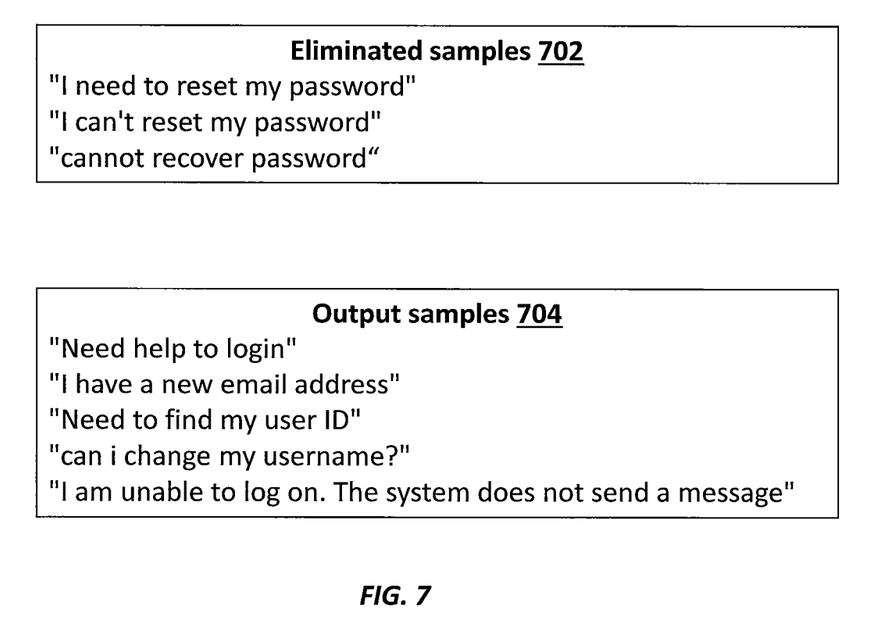
FIG. 7 provides example eliminated samples and output samples of a filter of the automated testing pipeline model, according to some embodiments described herein.

Referring to FIGS. 3 and 7, in some embodiments, a filter 316 of the automated testing pipeline model 308 may be used to generate filtered user queries based on the results from the pretrained language model 310 and the bag of words classifier 312. For example, the filter 316 may remove easy samples as identified by the BoW classifier 312. For further example, the filter 316 may remove samples that have the same prediction from the BoW classifier 312 and the PLM 310, which are easy samples for testing. In some embodiments, the filter 316 generates N filtered user queries by taking the top N ranked user queries from the remaining user queries. The ranking may be determined based on the diversity with the administrator intent set (e.g., a user query with a lower similarity confidence score is ranked higher).

Referring to FIG. 7, illustrated are examples of eliminated samples 702 by the filter 316. For example, the eliminated samples 702 may include easy samples (e.g., "I need to reset my password," "I can't reset my password") that have exact keyword matches with the administrator intent set or have the same predictions by the BoW classifier 312 and the PLM 310. The eliminated samples 702 may include samples (e.g., "cannot recover password") with a lower ranking, which indicates less diversity with the administrator intent set (e.g., a user query with a higher similarity confidence score) provided by the PLM 310.

The example FIG. 7 also illustrates examples of output samples 704 of the filter 316. For example, after filtering is performed to eliminate samples 702, the filter 316 provides output samples 704 including samples having better diversity with the administrator intent set, including e.g., "Need help to login," "I have a new email address," "Need to find my user ID," "can I change my username?," and "I am unable to log on. The system does not send a message."

Referring back to FIG. 3, in some embodiments, the output of the filter 316 is used as the testing dataset 320. In other embodiments, optionally, the automated testing pipeline framework 300 may receive manual selection/labeling inputs 318, which is used to select the testing dataset 320 from the output of the filter 316 of the automated testing pipeline model 308.

The testing dataset 320 may be sent to the trained model 304 that is to be tested, which generates testing results 322 that may be used to evaluate the performance of the trained model 304. Training dataset updates 324 may be generated based on the testing results 322.

In some embodiments, the training dataset updates 324 are generated automatically, e.g., by adding samples in the testing dataset 320 with poor performance results. In some other embodiments, a feedback cycle between model and human (referred to as human-in-the-loop) is established, and human/manual adjustment to the training set is performed based on the testing results. The automated testing pipeline model may identify gaps, and communicate them to the administrators, and the administrators may adjust the training dataset based on the feedback from the automated testing pipeline model, e.g., by adding missed/harder samples to the training set. As such, human-in-the-loop feedback cycles may lead to better model performance after each interaction of the feedback cycle.

The training dataset updates 324 may be sent to update the training dataset 302, which may be used to train the neural network model 304. Multiple training and testing cycles may be performed to improve the model performance based on the testing results in the previous cycle.

Figure 8:
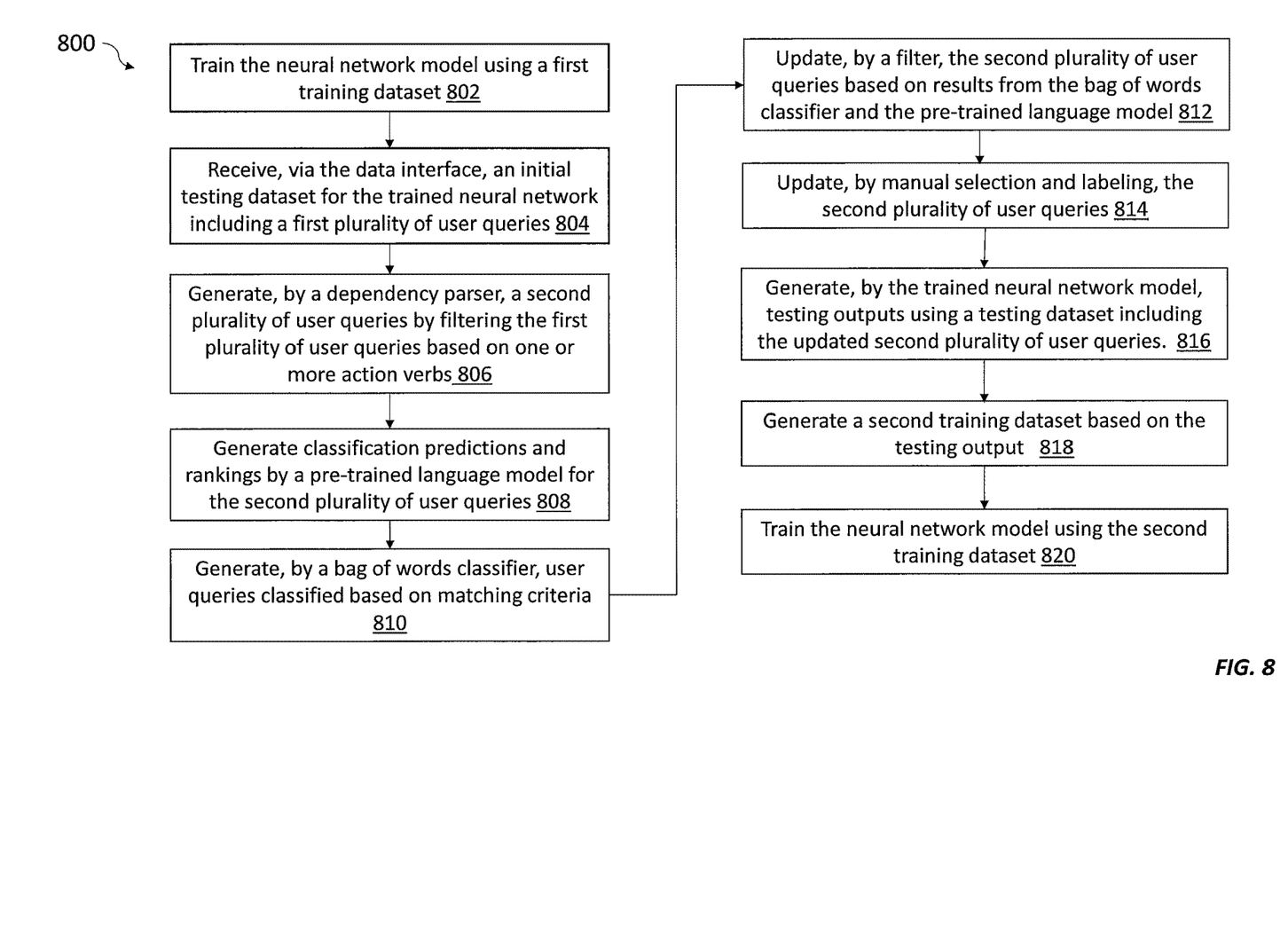
FIG. 8 is an example logic flow diagram illustrating a method of providing a testing dataset and improving the training set using the automated testing pipeline model, according to some embodiments described herein.

FIG. 8 is an example logic flow diagram illustrating a method of using the automated testing pipeline model to provide a testing dataset to test the performance of a neural network model and to the performance of the neural network by updating the training set using test results, according to some embodiments described herein. The method 800 may begin at block 802, where the neural network model (e.g., used to implement a chat-bot) is trained using a first training dataset (e.g., provided by an administer).

At block 804, an initial testing dataset for the trained neural network is received, where the initial testing dataset includes a first plurality of user queries. In some embodiments, to better test the model's robustness, it is desirable to use real-time data (e.g., customer queries in chat-bots applications). That's because in embodiments where the model is trained on the administrator provided dataset, there may exist a distribution shift between real-time production queries and training samples. The initial testing dataset may include a large amount of user queries (e.g., millions of chat conversations). While it is challenging to manually filter such a large amount of user queries to create a better testing dataset (e.g., including harder samples), as discussed below, the automated testing pipeline model filters the initial testing dataset automatically to generate the testing dataset.

At block 806, a dependency parser of the automated testing pipeline model generates a second plurality of user queries by filtering the first plurality of user queries based on one or more action verbs. As such, each user query of the second plurality of user queries has one or more action verbs.

At block 808, a pretrained language model receives the second plurality of user queries, and generates classification/prediction (e.g., the intent for performing an intent classification test) for the user queries. The pretrained language model may also generate a corresponding similarity confidence score for each of the second plurality of user queries. The confidence score may be used to rank the queries based on respective relationships with queries in the first training dataset. In various embodiments, the pretrained language model may be optionally finetuned by training using the first training dataset (e.g., the administrator provided intent dataset).

At block 810, a bag of words classifier may be used to generate classification/prediction (e.g., the intent for performing an intent classification test) for the user queries based on exact keyword matches with the first training dataset. The bag of words classifier may be finetuned by training using the first training dataset (e.g., the administrator provided intent dataset).

At block 812, a filter may be used to update the second plurality of user queries based on the results from the pretrained language model and the bag of words classifier. For example, the filter may be used to eliminate user queries that have the same predictions from the pretrained language model and the bag of words classifier. For further example, the filter may be used to keep only the top N user queries from the remaining user queries based on the ranking of the user queries based on its relation to the first training dataset. For example, the user queries that are more diverse from the first training dataset (e.g., harder samples) are ranked higher for selection.

At block 814, optionally, manual selection and/or labeling by an operator may be performed to update the second plurality of user queries (e.g., to reduce the bias of the pretrained language model, etc.).

At block 816, a testing dataset is provided using the updated second plurality of user queries. The testing dataset is sent to the trained neural network model to be tested. The trained neural network model generates test outputs using the testing dataset.

At block 818, a second training set may be generated based on the testing output. For example, training dataset updates may be generated based on the testing results, which may be used to update the first training set to generate the second training set. In some embodiments, the training dataset updates are generated automatically, e.g., by adding samples in the testing dataset with poor performance results to the first training dataset. In some other embodiments, a feedback cycle between model and human (referred to as human-in-the-loop) is established, and human/manual adjustment to the training set is performed based on the testing results. The automated testing pipeline model may identify gaps, and communicate them to the administrators, and the administrators may adjust the training dataset based on the feedback from the automated testing pipeline model, e.g., by adding missed/harder samples to the training set. As such, human-in-the-loop feedback cycles may lead to better model performance after each interaction of the feedback cycle.

At block 820, the second training dataset may be used to train the neural network model. Multiple training and testing cycles as described in method 800 may be performed to improve the model performance based on the testing results in the previous cycle.

Figure 9A:
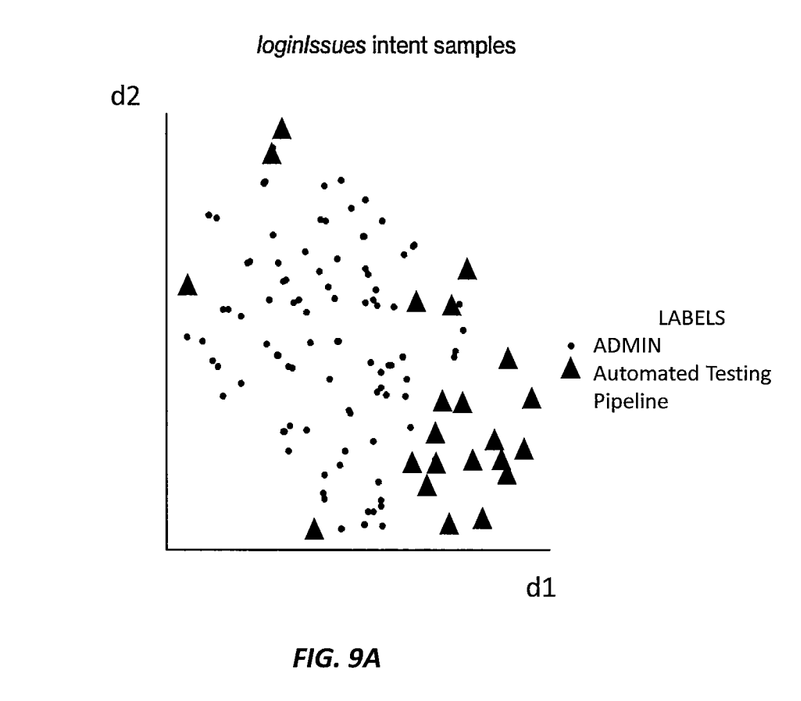
FIGS. 9A-9B provide example experimental results illustrating example data performance of the automated testing pipeline model described in relation to FIGS. 1-8, according to some embodiments described herein.
Figure 9B:
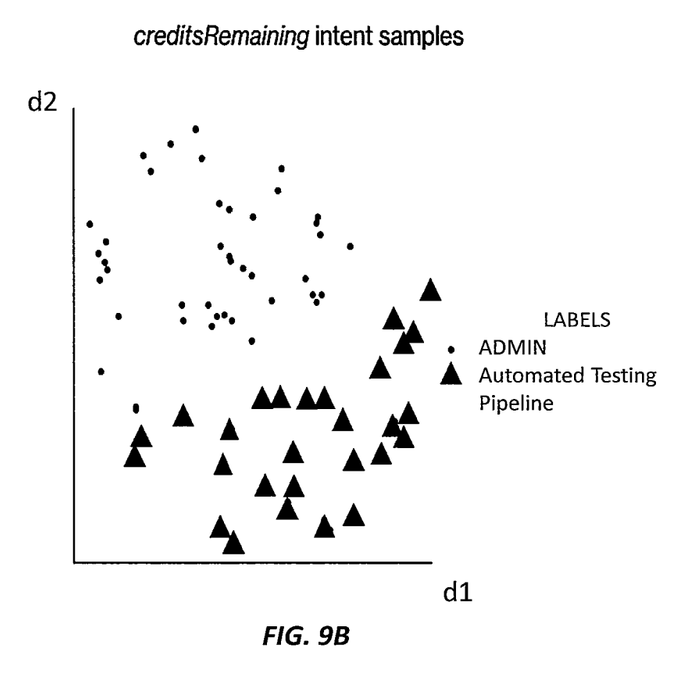

FIGS. 9A-9B provide example experimental results illustrating example data performance of the automated testing pipeline model described in relation to FIGS. 1-8, according to some embodiments described herein. As shown in FIGS. 9A and 9B, —distributed stochastic neighbor embedding (TSNE) method is used to plot the two-dimensional visualization graphs. The TSNE method is a statistical method for visualizing high-dimensional data by giving each datapoint a location in a two or three-dimensional map. Specifically, it models each high-dimensional object by a two- or three-dimensional point in such a way that similar objects are modeled by nearby points and dissimilar objects are modeled by distant points with high probability.

FIGS. 9A and 9B are TSNE plots illustrating sentence embedding projection of administrator defined samples, and the testing samples generated using the automated testing pipeline model using Gettys data. As shown in FIGS. 9A and 9B, for both intents ("loginIssues intent" and "creditsRemaining intent"), the testing dataset obtained with the automated testing pipeline model diverges enough from the original ADMIN provided samples. Using a diverse evaluation set, as provided by the automated testing pipeline can help to assess the generalization power of a model, because it allows the model to be tested on a variety of data that is representative of the real-world data it will encounter in practice. When a model is trained on a diverse training set and then evaluated on a diverse evaluation set, it can be more confidently assumed that the model will perform well on real-world data because it has been tested on a variety of data that is similar to what it will encounter in practice. Using a diverse evaluation set can also help to identify any biases or weaknesses in the model. For example, if the model performs poorly on certain types of data or data from certain demographics, this can indicate that the model may not be fully generalizable and may need further development or fine-tuning. Overall, using a diverse evaluation set can be an important step in ensuring that a model is well-suited for real-world applications and can help to identify any areas for improvement.

The automated testing pipeline model may be implemented for various needs. In some embodiments, the automated testing pipeline model may be used to detect out-of-distribution (OOD) automatically, based on the rankings of the samples. In some embodiments, the automated testing pipeline model may be implemented on a small group of user data (e.g., on few-hundred chats) to understand how frequent are hard eval examples.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of generating a testing dataset for a neural network model, the method comprising:

providing the neural network model trained using a first training dataset;

receiving, via a data interface, a first testing dataset for the trained neural network model including a first plurality of user queries;

generating, by a dependency parser, a second plurality of user queries by filtering the first plurality of user queries based on one or more action verbs;

generating, by a first pretrained language model (PLM), PLM classifications and rankings for the second plurality of user queries based on respective relationships with queries in the first training dataset;

generating, by a bag of words (BoW) classifier, BoW classifications for the second plurality of user queries using keyword matches with the user queries in the first training dataset;

generating a second testing dataset based on the PLM classifications and rankings and BoW classifications; and generating, by the trained neural network model, testing outputs using the second testing dataset.

2. The method of claim 1, wherein the generating the second testing dataset based on the PLM classifications and rankings and BoW classifications includes:
removing, from the second testing dataset, a third plurality of user queries, wherein the removed user queries have PLM classifications that are the same as the BoW classifications; and
generating the second testing dataset based on rankings of the remaining user queries.

3. The method of claim 2, wherein the remaining user queries are ranked based on confidence scores of the classifications of the user queries provided by the first pretrained language model, and
wherein a first user query with a lower confidence score is ranked with a higher priority than a second user query with a higher confidence score.

4. The method of claim 1, further comprising:
finetuning the first pretrained language model by training the first pretrained language model using the first training dataset.

5. The method of claim 1, further comprising:
finetuning the bag of word classifier by training the bag of word classifier using the first training dataset.

6. The method of claim 1, further comprising:
receiving an updated first training dataset generated by updating the first training dataset based on the testing outputs; and
training the neural network model using the updated first training dataset.

7. The method of claim 1, further comprising:
generating, by a second pretrained language model, classifications and rankings for the second plurality of user queries; and
ranking the second plurality of user queries by combining the rankings generated by the first pretrained language model and the second pretrained language model.

8. A system for providing a testing dataset for a neural network model, the system comprising:
a memory that stores an automated testing pipeline model and a plurality of processor-executable instructions;
a communication interface that receives a first testing dataset including a first plurality of user queries for a trained neural network trained using a first training dataset; and
one or more hardware processors that read and execute the plurality of processor-executable instructions from the memory to perform operations comprising:
generating, by a dependency parser, a second plurality of user queries by filtering the first plurality of user queries based on one or more action verbs;
generating, by a first pretrained language model (PLM), PLM classifications and rankings for the second plurality of user queries based on respective relationships with queries in the first training dataset;
generating, by a bag of words (BoW) classifier, BoW classifications for the second plurality of user queries using keyword matches with the user queries in the first training dataset;
generating a second testing dataset based on the PLM classifications and rankings and BoW classifications; and
generating, by the trained neural network model, testing outputs using the second testing dataset.

9. The system of claim 8, wherein the generating the second testing dataset based on the PLM classifications and rankings and BoW classifications includes:
removing, from the second testing dataset, a third plurality of user queries, wherein the removed user queries have PLM classifications that are the same as the BoW classifications; and
generating the second testing dataset based on rankings of the remaining user queries.

10. The system of claim 9, wherein the remaining user queries are ranked based on confidence scores of the classifications of the user queries provided by the first pretrained language model, and
wherein a first user query with a lower confidence score is ranked with a higher priority than a second user query with a higher confidence score.

11. The system of claim 8, wherein the operations further comprise:
finetuning the first pretrained language model by training the first pretrained language model using the first training dataset.

12. The system of claim 8, wherein the operations further comprise:
finetuning the bag of word classifier by training the bag of word classifier using the first training dataset.

13. The system of claim 8, wherein the operations further comprise:
receiving an updated first training dataset generated by updating the first training dataset based on the testing outputs; and
training the neural network model using the updated first training dataset.

14. The system of claim 8, wherein the operations further comprise:
generating, by a second pretrained language model, classifications and rankings for the second plurality of user queries; and
ranking the second plurality of user queries by combining the rankings generated by the first pretrained language model and the second pretrained language model.

15. A non-transitory machine-readable medium comprising a plurality of machine-executable instructions which, when executed by one or more processors, are adapted to cause the one or more processors to perform operations comprising:
providing a neural network model trained using a first training dataset;
receiving, via a data interface, a first testing dataset for the trained neural network including a first plurality of user queries;
generating, by a dependency parser, a second plurality of user queries by filtering the first plurality of user queries based on one or more action verbs;
generating, by a first pretrained language model (PLM), PLM classifications and rankings for the second plurality of user queries based on respective relationships with queries in the first training dataset;
generating, by a bag of words (BoW) classifier, BoW classifications for the second plurality of user queries using keyword matches with the user queries in the first training dataset;
generating a second testing dataset based on the PLM classifications and rankings and BoW classifications; and
generating, by the trained neural network model, testing outputs using the second testing dataset.

16. The non-transitory machine-readable medium of claim 15, wherein the generating the second testing dataset based on the PLM classifications and rankings and BoW classifications includes:
- removing, from the second testing dataset, a third plurality of user queries, wherein the removed user queries have PLM classifications that are the same as the BoW classifications; and
- generating the second testing dataset based on rankings of the remaining user queries.

17. The non-transitory machine-readable medium of claim 15,
- wherein the remaining user queries are ranked based on confidence scores of the classifications of the user queries provided by the first pretrained language model, and
- wherein a first user query with a lower confidence score is ranked with a higher priority than a second user query with a higher confidence score.

18. The non-transitory machine-readable medium of claim 15, wherein the operations further comprise:
- finetuning the first pretrained language model by training the first pretrained language model using the first training dataset.

19. The non-transitory machine-readable medium of claim 15, wherein the operations further comprise:
- finetuning the bag of word classifier by training the bag of word classifier using the first training dataset.

20. The non-transitory machine-readable medium of claim 15, wherein the operations further comprise:
- receiving an updated first training dataset generated by updating the first training dataset based on the testing outputs; and
- training the neural network model using the updated first training dataset.

\* \* \* \* \*